US006507160B2

(12) United States Patent
Wood et al.

(10) Patent No.: US 6,507,160 B2
(45) **Date of Patent: *Jan. 14, 2003**

(54) HORIZONTALLY MOVABLE PORTAL CLOSURE SYSTEM

(75) Inventors: John R. Wood, San Antonio, TX (US); Jeff S. Wood, San Antonio, TX (US)

(73) Assignee: Linear Millenium Products, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/929,251

(22) Filed: Aug. 13, 2001

(65) Prior Publication Data

US 2002/0050801 A1 May 2, 2002

Related U.S. Application Data

(63) Continuation-in-part of application No. 09/599,621, filed on Jun. 22, 2000.

(60) Provisional application No. 60/148,556, filed on Aug. 12, 1999.

(51) Int. Cl.[7] .................................................. H02P 3/00

(52) U.S. Cl. ........................ 318/264; 318/265; 318/286; 318/466; 318/135

(58) Field of Search ................................. 318/264–266, 318/286, 466–469, 618, 135; 49/26–27

(56) References Cited

U.S. PATENT DOCUMENTS

| | | | | |
|---|---|---|---|---|
| 3,697,838 A | 10/1972 | New | ......................... | 318/135 |
| 3,706,922 A | 12/1972 | Inagaki | ....................... | 318/135 |
| 4,529,920 A | 7/1985 | Yoshida et al. | ............. | 318/466 |
| 4,796,011 A | 1/1989 | Lemirande et al. | ......... | 318/266 |
| 4,855,653 A | 8/1989 | Lemirande | .................. | 318/282 |
| 4,979,603 A | 12/1990 | Wheatland | .................. | 318/469 |
| 5,141,082 A | 8/1992 | Ishii et al. | .................. | 318/135 |
| 5,237,252 A | 8/1993 | Tanaka et al. | .............. | 318/135 |
| 5,869,940 A | 2/1999 | Parsadayan | ................. | 318/466 |
| 5,896,951 A | 4/1999 | Reddy et al. | ............... | 187/316 |
| 6,091,217 A | 7/2000 | Parsadayan | ................. | 318/286 |
| 6,346,786 B1 * | 2/2002 | Wood et al. | ................ | 318/264 |

* cited by examiner

*Primary Examiner*—Marlon T. Fletcher
(74) *Attorney, Agent, or Firm*—Jenkens & Gilchrist, A Professional Corporation

(57) ABSTRACT

A system and method for moving a horizontally sliding portal closure includes a linear reluctance motor or a magnetic stepper motor and a reaction piece. The reaction piece is attached to the portal closure such that activation of the stationary mounted linear induction or magnetic stepper motor causes movement of the reaction piece which, in turn, opens or closes the portal closure.

38 Claims, 2 Drawing Sheets

HORIZONTALLY MOVABLE PORTAL CLOSURE SYSTEM

This application is a continuation-in-part of U.S. patent application Ser. No. 09/599,621 filed Jun. 22, 2000 which derives its priority from U. S. Provisional Patent Application Serial No. 60/148,556 filed Aug. 12, 1999.

FIELD

The present invention applies to fence and barrier systems; more particularly, the present invention applies to gate or door opening systems typically used with fences or barriers.

BACKGROUND

For as long as fences or barriers have been used to enclose spaces, there has been a need to include in the fence or barrier system a portal for gaining access to the enclosed space. For security and for many other reasons, the portal to which access to the enclosed space may be gained typically includes a movable closure. Such movable portal closures may be opened in a variety of different directions to include both horizontal (parallel to the earth's surface) and vertical (perpendicular to the earth's surface). The present invention pertains to portal closures whose movement is substantially horizontal, such horizontal movement being along either a linear or an arcuate path with respect to the fence or barrier system.

Numerous systems have been used over the years to open portal closures such as gates or doors. One of the most common systems is a chain-drive system wherein the teeth on a rotating, stationary mounted, sprocket are used to engage the openings in a chain, which chain is mounted to the portal closure. Such chain drive systems are slow, cumbersome, and prone to breakage. Such chain drive systems are also subject to the effects of weather; particularly the destructive effects of repeated exposure to moisture. Gates which open on an arcuate path typically use long arms--which long arms are prone to breakage.

There is therefore a need in the art to provide a system for opening a portal closure which will be fast operating, easy to use, and low in maintenance.

SUMMARY

A fast operating, easy to use, and relatively maintenance free system and method for moving a horizontally movable gate or door includes a stationary mounted linear induction motor, a magnetic stepper motor or a linear reluctance motor. A reaction piece, either a reaction plate or a reaction rod, is caused to move by the linear induction motor, the magnetic stepper motor or the linear reluctance motor. The movement of the reaction piece, which is mounted to the gate or door, is then used to control the opening and closing of the gate or door. When it is desired to open the gate or door, the linear induction motor the magnetic stepper motor, or the linear reluctance motor is activated. The activation of the motor causes the reaction plate or reaction rod to move with respect to the position of the motor. Because the reaction plate or reaction rod is mounted to the gate or door, the movement of the reaction plate or reaction rod causes the gate or door to move to an open position so that access to an enclosed space is permitted. Alternatively, the movement of the gate or door may be to a closed position so that the opening to the enclosed space is blocked.

BRIEF DESCRIPTION OF THE DRAWING FIGURES

A better understanding of the system and method for moving a horizontally movable portal closure of the present invention will be had by reference to the drawing figures wherein.

DETAILED DESCRIPTION OF THE EMBODIMENTS

As may be seen by reference to FIG. 1 and FIG. 2, the system and method of the present invention 10, 110 is described with reference to the opening and closing of a gate 20, 120 in a fence 100. Those of ordinary skill in the art will understand that the present invention has applicability to any type of portal closure whose movement is substantially horizontal—either parallel or at an angle to the fence 100. The portal may be formed in a gate, a wall, or any type of barrier which encloses a space.

Figure 1:
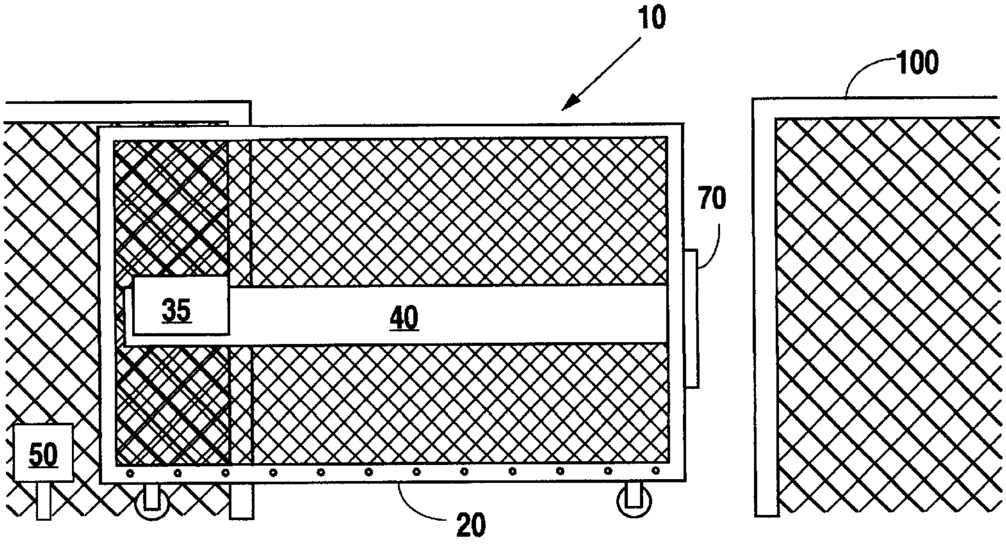
FIG. 1 is a schematic front elevational view of the system of the present invention on a linearly horizontally moving portal closure.

In FIG. 1, a first embodiment of the system and method of the present invention 10 utilizes a linear induction motor system 35 of the type that is frequently used on amusement park rides, particularly roller coasters. In a roller coaster, such linear induction motor systems initiate the motion of the string of passenger cars up an incline at the top of which the coasting motion of the ride begins. Specifically, such linear induction motor systems include a reaction plate on the roller coaster passenger car. The reaction plate is constructed and arranged to be moved by a series of linear induction motors mounted between the rails on which the passenger cars roll. The reaction plates used in linear induction motor systems may be made of steel covered with a non-magnetic metal such as aluminum or copper, or they may be made from a solid non-magnetic metal such as aluminum or copper. Because of the magnetic fields applied by the linear induction motor to the reaction plate, the reaction plate is caused to be accelerated from a rest condition to a predetermined velocity past the linear induction motor.

In FIG. 1, the linear induction motor 35 imparts motion to the reaction plate 40 which causes the gate 20 to slide horizontally between open and closed positions. In FIG. 2, the linear induction motor 135 imparts motion to the reaction rod 145 which causes the gate 120 to swing on hinges 125 between open and closed positions.

Alternatively, a magnetic stepper motor may be used instead of a linear induction motor. When a magnetic stepper motor is used the reaction plate may include a plurality of steel ridges formed on a steel plate. The steel ridges on the steel plate electrically interact with the permanent magnets within the magnetic stepper motor. When a reaction rod is used, the steel rod may include a plurality of steel rings. The steel rings electrically interact with the permanent magnets in the stepper motor. The configuration and design of such ridges or rings is well known to those of ordinary skill in the art.

Figure 4B:
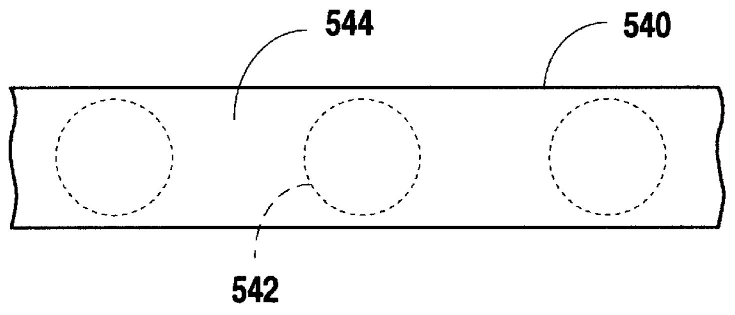
FIG. 4B is a top plan view of the reaction plate shown in FIG. 4A.
Figure 4A:
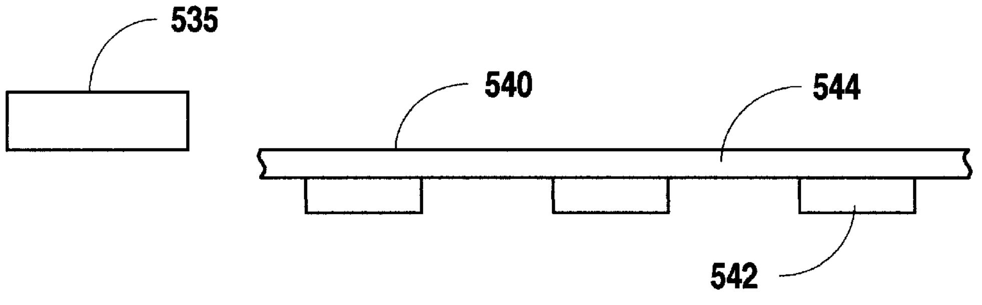
FIG. 4A is a front elevational view of a reaction plate to be used with a linear reluctance motor.

In yet another alternative embodiment a linear reluctance motor 535 may be used in place of the linear induction motor illustrated schematically in FIG. 1. When a linear reluctance motor 535 is used, the reaction plate is constructed differently. As shown in FIGS. 4A and 4B the reaction plate 540 constructed and arranged for use with a linear reluctance motor includes a plurality of substantially circular magnetic steel secondary segments 542 mounted on a non-magnetic material 544. If the gate or door to be moved is also made from a magnetic steel then the secondary segments must be separated magnetically by a gap greater than the spacing between the secondary segments. One advantage to the use of the reaction plate 540 shown in FIGS. 4A and 4B with a linear reluctance motor 535 is the significant reduction in amperage needed to operate the horizontally movable portal closure system.

As is commonly experienced with motors such as linear induction motors, magnetic stepper motors or linear reluctance motors 35, 135, the acceleration of the reaction plate or reaction rod past the motor 35 or through the motor 135 can be quite rapid. Such rapid acceleration is particularly desirable in a situation where it is necessary to open and close a portal closure in a minimum amount of time—as in prisons or incarceration facilities.

When it is desired to move the portal closure 20, 120 from a first closed or rest position, it is necessary to accelerate the portal closure 20, 120 to a predetermined linear or arcuate speed. As the portal closure 20, 120 nears the end of its travel path, it is then necessary to decelerate the portal closure 20, 120 from its linear or arcuate speed to a second nonmoving or rest position. Such acceleration and deceleration of the portal closure 20, 120 is easily governed by controlling the force and direction imparted on the reaction plate 40 or reaction rod 145 by the linear induction motor, the magnetic stepper motor or the linear reluctance motor 35, 135. For particularly heavy gates a second linear induction motor, a second magnetic stepper motor or a second linear reluctance motor may be placed alongside the first motor on the same side of the reaction plate or reaction rod or on the opposite side of the reaction plate or reaction rod.

While it is possible to program into the electronics 60 that control the linear induction motor, the magnetic stepper motor or the linear reluctance motor 35, 135, the amount of time needed to accelerate the portal closure 20, 120 to its desired translational speed, then move the portal closure 20, 120 at this desired translational speed for a predetermined period of time or travel distance, and then decelerate the movement of the portal closure 20, 120 at the end of its travel path according to a selected time or travel distance, some applications may require more precise control of the position of the portal closure 20, 120. More precise control of the movement of the portal closure 20, 120 may be obtained by the use of a position sensing system 50 (FIG. 3) which provides a signal indicative of the position of the portal closure 20 along its travel path. Such position sensors may be inductive, rotary, magnetic, or photoelectric. Such inductive, rotary, magnetic, or photoelectric position sensors 50 are well known to those of ordinary skill in the art.

Figure 3:
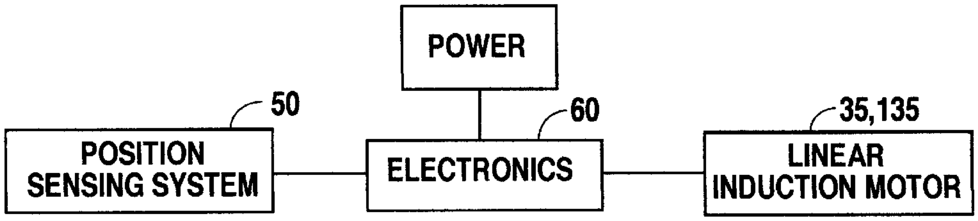
FIG. 3 is a schematic diagram of the electrical connection of the various parts of the system.

As shown in FIG. 3, the signals obtained from the position sensors 50 may be electronically transmitted or coupled to an electronic control means 60. The electronic control means 60 governs the force applied by the linear induction motor, the magnetic stepper motor or the linear reluctance motor on the reaction plate 40 or the reaction rod 145 so that the termination of the period of acceleration of the travel of the portal closure 20, 120 to the translational speed may be governed by the actual position of the portal closure 20, 120, and the initiation of the deceleration of the motion of the portal closure 20, 120 to the second or rest position may also be governed by the sensed position of the portal closure 20, 120.

As shown in FIG. 1, the portal closure 20, may include one or more pressure sensitive switches 70 on its ends to cut off power to the motor 35 when the position of the portal closure 20 matches the first or second rest position of the portal closure or when an object appears in the path of travel of the moving portal closure 20. A similar array of pressure sensitive switches may also be used on the embodiment shown in FIG. 2. Power may be supplied to the system from commercially available sources of electrical energy, or a solar power unit may be used to provide the necessary electrical energy to operate the system.

Figure 2:
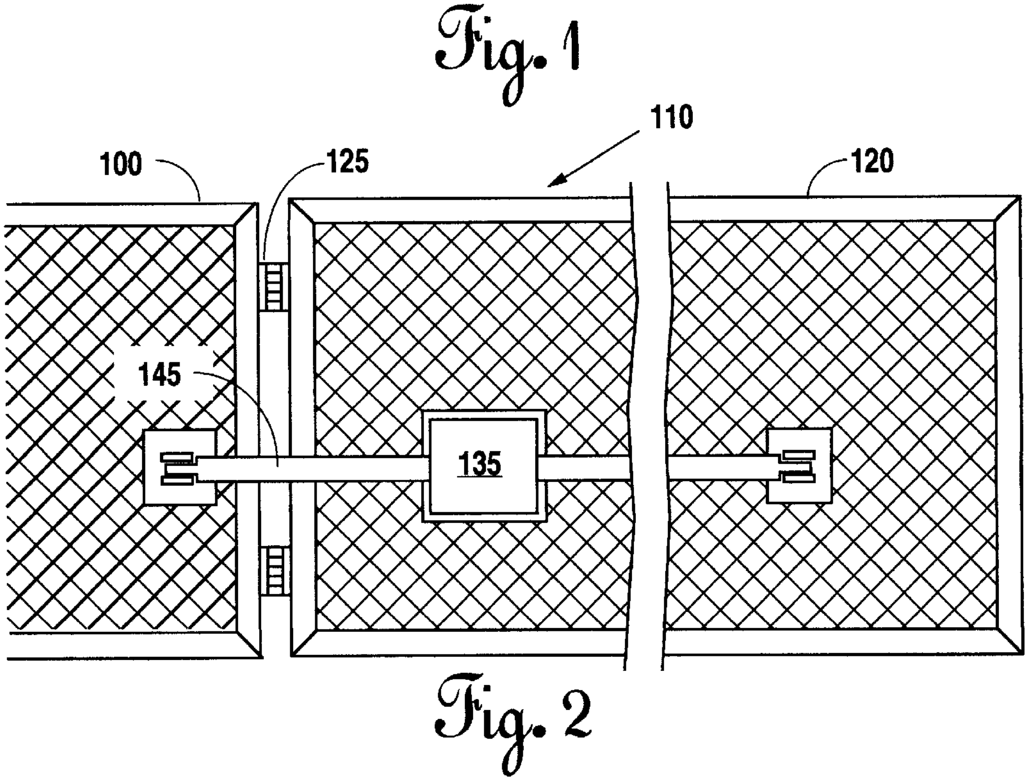
FIG. 2 is a schematic front-elevational view of the system of the present invention on an arcuately horizontally movable portal closure.

As shown in FIG. 2, the alternate embodiment of the system 110 of the present invention may be constructed so that it is operable with an arcuately pivotable gate or portal closure. Specifically, a reaction rod 140 is caused to pass through a linear induction motor, a magnetic stepper motor or a reluctance motor. This will cause the portal closure 120 to swing open or closed, pivoting on a pair of hinges 125. Those of ordinary skill in the art will understand that a single long hinge may be used or a plurality of hinges may be used without detracting from the operability of the disclosed invention.

As shown in FIG. 1, the construction of the system and method for moving a movable portal closure of the present invention horizontally includes simply mounting the reaction plate 40 on a gate 20 which is movable along a horizontal path. This motion is typically governed by a wheel and track assembly, guideways or other systems well known to those of ordinary skill in the art.

The linear induction motor, the magnetic stepper motor, or the linear reluctance motor is located in close proximity to the travel path of the moving portal closure. Typically, the linear induction motor, the magnetic stepper motor or the linear reluctance motor is mounted in a stationary manner near the edge of the portal which is formed in the enclosure surrounding the space through which access through the portal is obtained.

While the foregoing disclosure enables those of ordinary skill in the art to make and use the disclosed invention, it will be understood that the foregoing disclosure will also enable those of ordinary skill in the art to make similar embodiments which include the principles of the disclosed invention. Such similar embodiments shall be included within the scope of the appended claims.

What is claimed is:

1. A system for moving a horizontally movable portal closure, said system comprising:

means for guiding the horizontal movement of said portal closure;

a magnetic stepper motor assembly including a reaction piece attached to said portal closure;

said magnetic stepper motor system constructed and arranged to impart horizontal motion to said reaction piece;

whereby the portal closure is moved without any mechanical contact between said magnetic stepper motor and said reaction piece.

2. The system as defined in claim 1 further including electronic control means for accelerating the motion of the portal closure from a first rest position to a predetermined translational speed and then decelerating the motion of the portal closure from said predetermined translational speed to a second rest position.

3. The system as defined in claim 2 further including position sensor means coupled to said electronic control means for imparting a motion control signal to said electronic control means at predetermined points along the movement path of said portal closure.

4. The system as defined in claim 3 wherein said position sensor means are inductive.

5. The system as defined in claim 3 wherein said position sensor means are magnetic.

6. The system as defined in claim 3 wherein said position sensor means are photoelectric.

7. The system as defined in claim 3 wherein said position sensor means are rotary.

8. The system as defined in claim 1 further including at least one switch located on said portal closure for cutting off the power to said magnetic stepper motor system.

9. A method for controlling the movement of a portal closure in a horizontal plane, said method comprising the steps of:

mounting a reaction piece to the portal closure;

mounting a magnetic stepper motor in a stationary position with respect to said reaction piece;

whereby activation of said magnetic stepper motor will accelerate or decelerate said reaction piece, which in turn imparts motion to said portal closure, without mechanical contact between said reaction piece and said magnetic stepper motor.

10. The method as defined in claim 9 further including the step of regulating the force imparted to said reaction piece by said magnetic stepper motor.

11. The method as defined in claim 9 further including the step of sensing the position of said portal closure.

12. The method as defined in claim 11 further including the step of regulating the force applied by said linear induction motor on said reaction piece by the sensed position of said portal closure.

13. A system for controlling access to an enclosed space comprising:

a portal enabling access to said enclosed space;

a horizontally movable closure constructed and arranged to control passage through said portal;

a reaction piece mounted to said horizontally movable closure; and a magnetic stepper motor constructed and arranged to impart horizontal motion to said reaction plate;

whereby the portal closure is moved without any mechanical contact between said magnetic stepper motor and said reaction piece.

14. The system as defined in claim 13 wherein said horizontally movable closure is linearly slidable.

15. The system as defined in claim 13 wherein said horizontally movable closure is a arcuately pivotable.

16. The system as defined in claim 13 further including an electronic controller constructed and arranged to govern the motion of said horizontally movable closure.

17. The system as defined in claim 16 wherein said electronic controller enables the acceleration of said horizontally movable closure to a predetermined translational speed upon the initiation of the movement of said horizontally movable closure.

18. The system as defined in claim 16 wherein said electronic controller enables the deceleration of said horizontally movable closure from a predetermined translational speed in anticipation of the termination of the movement of said horizontally movable closure.

19. A system for moving a horizontally movable portal closure, said system comprising:

means for guiding the horizontal movement of said portal closure;

a linear reluctance motor system including a reaction piece attached to said portal closure;

said linear reluctance motor system constructed and arranged to impart horizontal motion to said reaction piece;

whereby the portal closure is moved without any mechanical contact between said linear reluctance motor and said reaction piece.

20. The system as defined in claim 19 wherein said reaction plate includes a plurality of magnetic segments mounted on a non-magnetic material.

21. The system as defined in claim 20 wherein said magnetic segments are spaced apart, substantially circular disk.

22. The system as defined in claim 19 further including electronic control means for accelerating the motion of the portal closure from a first rest position to a predetermined translational speed and then decelerating the motion of the portal closure from said predetermined translational speed to a second rest position.

23. They system as defined in claim 22 further including position sensor means coupled to said electronic control means for imparting a motion control signal to said electronic control means at predetermined points along the movement path of said portal closure.

24. The system as defined in claim 23 wherein said position sensor means are inductive.

25. The system as defined in claim 23 wherein said position sensor means are magnetic.

26. The system as defined in claim 23 wherein said position sensor means are photoelectric.

27. The system as defined in claim 23 wherein said position sensor means are rotary.

28. The system as defined in claim 19 further including at least one switch located on said portal closure for cutting off the power to said linear reluctance motor system.

29. A method for controlling the movement of a portal closure in a horizontal plane, said method comprising the steps of:

mounting a reaction piece to the portal closure;

mounting a linear reluctance motor in a stationary position with respect to said reaction piece;

whereby activation of said linear reluctance motor will impart motion to said reaction piece, which in turn imparts motion to said portal closure without any mechanical contact between said reaction piece and said linear reluctance motor.

30. The method as defined in claim 29 further including the step of regulating the force imparted to said reaction piece by said linear reluctance motor.

31. The method as defined in claim 29 further including the step of sensing the position of said portal closure.

32. The method as defined in claim 31 further including the step of regulating the force applied to said reaction piece by said linear reluctance motor according to the sensed position of said portal closure.

33. A system for controlling access to an enclosed space comprising:

a portal enabling access to said enclosed space;

a horizontally movable closure constructed and arranged to control passage through said portal;

a reaction piece mounted to said horizontally movable closure; and a linear reluctance motor constructed and arranged to impart horizontal motion to said reaction piece;

whereby the portal closure is moved without any mechanical contact between said linear reluctance motor and said reaction piece.

34. The system as defined in claim 33 wherein said horizontally movable closure is linearly slidable.

35. The system as defined in claim 33 wherein said horizontally movable closure is arcuately pivotable.

36. The system as defined in claim 33 further including an electronic controller constructed and arranged to govern the motion of said horizontally movable closure.

37. The system as defined in claim 36 wherein said electronic controller enables the acceleration of said horizontally movable closure to a predetermined translational speed upon the initiation of the movement of said horizontally movable closure.

38. The system as defined in claim 36 wherein said electronic controller enables the deceleration of said horizontally movable closure from a predetermined translational speed in anticipation of the termination of the movement of said horizontally movable closure.

* * * * *